United States Patent [19]

Rodriguez Sanchez

[11] Patent Number: 5,660,164
[45] Date of Patent: Aug. 26, 1997

[54] SHOWER APPARATUS HEATED BY SOLAR RADIATION

[76] Inventor: Jesús Rodriguez Sanchez, Dr. Fleming S/N Pol. Industrial Torrehjerro, 45600 Talavera de la Reina-Toledo, Spain

[21] Appl. No.: 347,473

[22] PCT Filed: Sep. 9, 1993

[86] PCT No.: PCT/ES93/00073

§ 371 Date: Jan. 13, 1995

§ 102(e) Date: Jan. 13, 1995

[87] PCT Pub. No.: WO94/23251

PCT Pub. Date: Oct. 13, 1994

[30] Foreign Application Priority Data

Apr. 2, 1993 [ES] Spain ............ 9300690

[51] Int. Cl.$^6$ .................... F24J 2/04
[52] U.S. Cl. ............ 126/640; 126/652; 126/563; 4/599
[58] Field of Search .......... 126/640, 592, 126/652, 705, 711, 654; 4/599, 603, 615, 616, 900, 493

[56] References Cited

U.S. PATENT DOCUMENTS

| | | | |
|---|---|---|---|
| 3,629,875 | 12/1971 | Dow et al. | 4/599 |
| 4,381,763 | 5/1983 | Kahl | 126/563 |
| 4,453,280 | 6/1984 | Greenleaf | 4/599 |
| 4,520,793 | 6/1985 | Hall | 126/640 X |
| 4,552,125 | 11/1985 | Borodulin et al. | 126/640 |
| 4,757,803 | 7/1988 | Dixon | 126/652 X |
| 5,111,538 | 5/1992 | Chapman | 4/599 |

FOREIGN PATENT DOCUMENTS

| | | |
|---|---|---|
| 391204 | 9/1990 | Australia . |
| 901746 | 5/1985 | Belgium . |
| 1453606 | 9/1966 | France . |
| 2414601 | 8/1979 | France . |
| 2933511 | 3/1980 | Germany . |
| 2842416 | 4/1980 | Germany . |
| 3002852 | 7/1981 | Germany . |
| 675470 | 9/1990 | Switzerland . |

*Primary Examiner*—Larry Jones
*Attorney, Agent, or Firm*—Merchant, Gould, Smith, Edell, Welter & Schmidt, P.A.

[57] ABSTRACT

Shower apparatus (1) heated by solar apparatus radiation (3) used in open spaces, made of any type of material, and installed in a substantially vertical position, which comprises the structural configuration of the apparatus in addition to act as accumulation container (2) of water heated by sunbeam (3), so that the vertical cylinder (2) made of rigid material is used both as an accumulator storage of hot water and as a carrier structure for the apparatus. The storage cylinder may be coated with a protection cover which avoids the cooling produced by ambient air.

5 Claims, 2 Drawing Sheets

SHOWER APPARATUS HEATED BY SOLAR RADIATION

CROSS-REFERENCES TO RELATED APPLICATIONS

This is a national stage application based on PCT application PCT/ES93/00073, filed 9th Sep. 1993, which claims priority from Spanish application P9300690, filed 2nd Apr. 1993.

FIELD OF THE INVENTION

The present invention relates to a new disposition of elements and material components, which takes advantage of the solar heat in order to heat the water which is used in showers installed in open spaces, such as pools, gardens, chalets, campgrounds, etc.

SUMMARY OF THE INVENTION

This type of shower uses a rigid cylinder as heating deposit upon which solar beams fall directly which provide the heating supply on to the water contained in the same. The cylinder is installed at a more or less vertical position for which a plate is attached to the lower part thereof which serves as support and fixing means of the cylinder at the place where the shower is installed. At the upper end of the cylinder a water pulverizer or atomizer with adjustable inclination is installed by means of a hose. Said pulverizer is supplied directly from the water contained in the cylinder and/or also directly from the water maintenance installations. The selection or mixing of each supply channel is carried out by means of valves installed at the vertical side of the cylinder together with the corresponding pipings. All of which is protected inside a longitudinal protector attached to the cylinder and in vertical position. The grips of the valves, situated outside said housing allow for the adjustment and selection of cold and/or hot water.

Furthermore, said shower apparatus has connection for the water supply piping, and cylinder emptying plug in order to avoid deterioration due to frost in winter time.

For a higher efficiency in obtaining heat from solar beams, use is made, in the construction of the apparatus, from materials of high thermal conductivity and high resistance against climatic erosion and corrosion caused by waters.

The cylinder-deposit may be provided by a protecting cover which prevents the cooling of the contained water caused by the environmental air.

The products used in the manicuring of the cylinder-deposit are rigid materials and conductors of heating energy, such as for example, aluminium-magnesium, which is capable of gaining not only the solar heat, but the enviromental heat while the materials used in the existing solar gainers only gain the solar energy and not the enviromental energy since they are hot water accumulators.

The reason for using materials such as those mentioned hereinabove, for example, aluminium-magnesium is to obtain excellent efficiency during the day-time activity hours in gardens, pools, etc, for which the present invention is not based upon what is normally known in relation to storage and accumulating hot water for use, for example, at five o'clock in the morning, but it deals with a more rapid and efficient system of producing hot water at times when it is really needed and used.

Another advantage is that the beams which fall upon one point of the cylinder-deposit are rapidly distributed to all its surroundings so that the water has more contact with the thermal gainer element.

BRIEF DESCRIPTION OF THE DRAWINGS

The object of the present invention would be better understood with the aid of the following description made on the basis of a practical example of an embodiment. Said description is carried out with the help of the accompanying drawings in which.

DESCRIPTION OF THE PREFERRED EMBODIMENT

Figure 1:
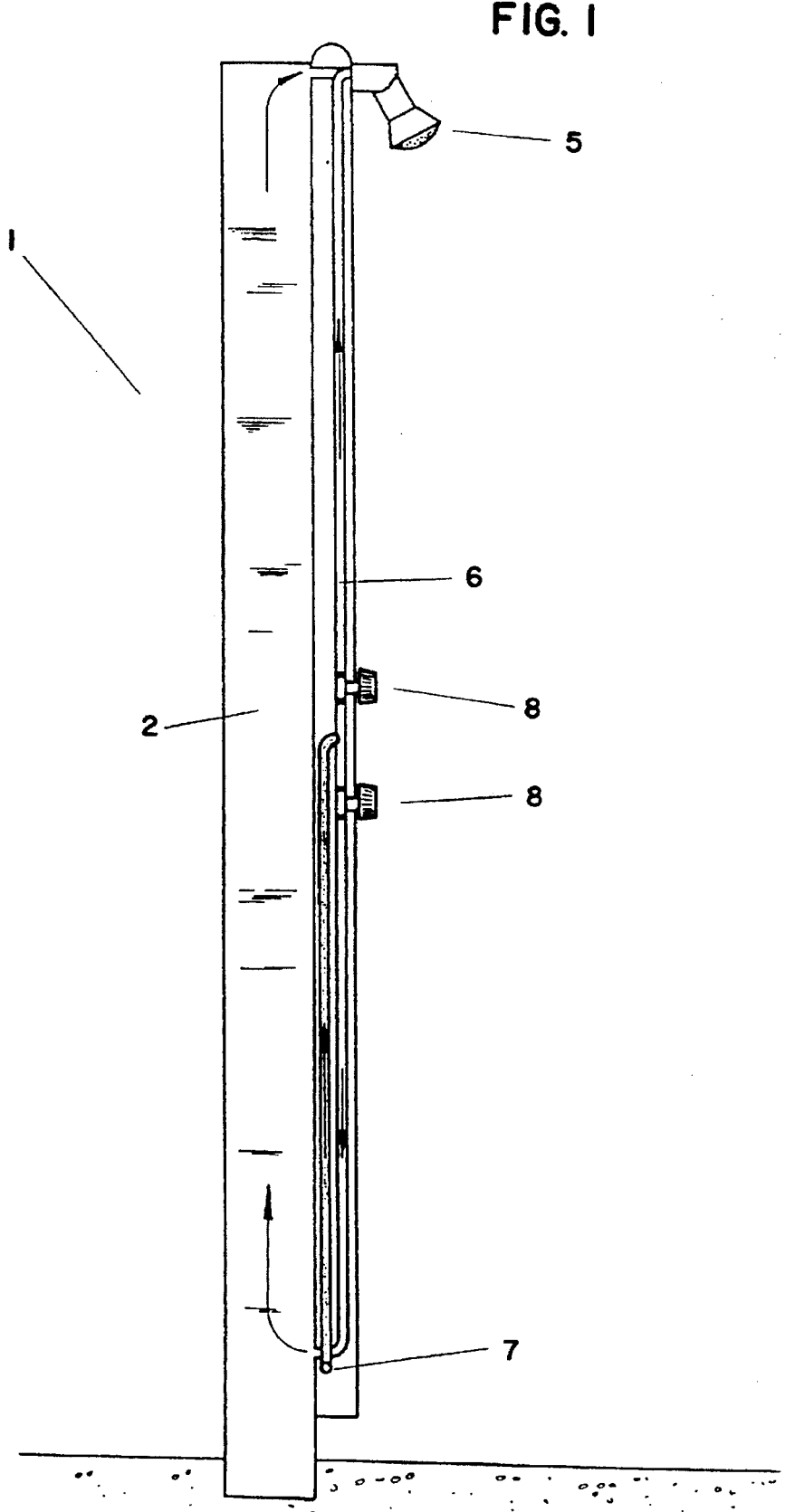
FIG. 1 shows an elevation view of the system object of the present invention.
Figure 2:
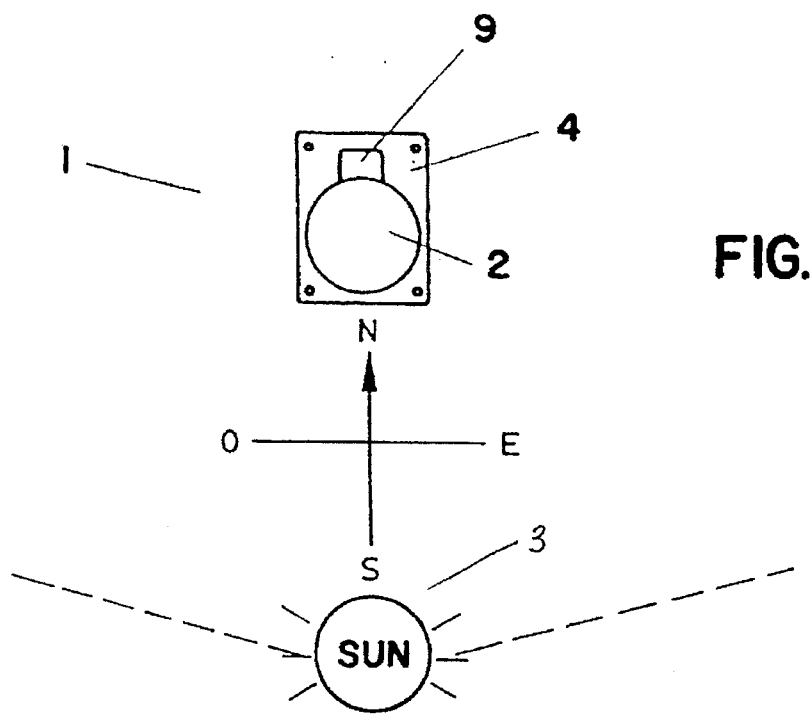
FIG. 2 shows in a plan view, the direction in which the device is placed.
Figure 3:
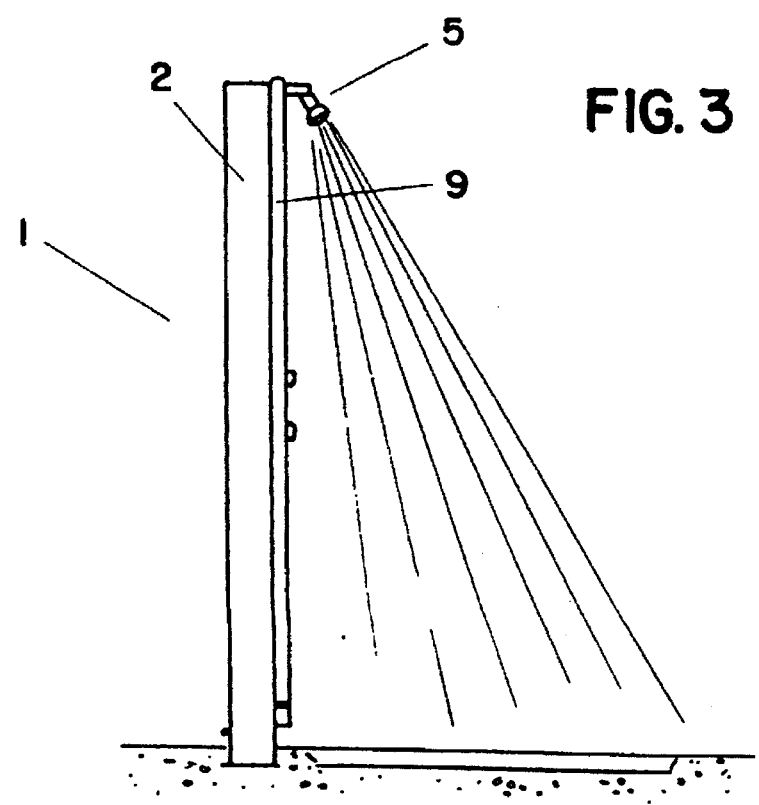
FIG. 3 shows an elevation view of the shower in operation.

This type of shower (1) uses a rigid cylinder (2) as a heating deposit, over which, solar beams (3) fall directly, acting as heating supply on the water contained therein. The cylinder (2) is installed in a more or less vertical position for which a plate (4) is attached to the lower part thereof which serves as support and fixing means of the cylinder (2) at the place where the shower (1) is installed. At the upper end of the cylinder a water pulverizer or atomizer (5) with adjustable inclination is installed by means of a hose. Said pulverizer (5), is supplied directly by the water contained in the cylinder (2) through the conduit (6) and/or also directly from the water maintenance installation (7). The selection or mixture of each supply channel is made by means of valves (8) installed at a vertical side of the cylinder (2) together with the corresponding pipings (6) and (7). All of which is protected inside a longitudinal protector attached to the cylinder (2) in vertical position. The grips of the valves (8), located outside said housing allow for the adjustment and selection of cold and/or hot water.

Furthermore, said shower apparatus (1) has connection for the water supply piping, and cylinder emptying plug in order to avoid deterioration due to frost in winter time.

For a higher efficiency in obtaining heat from the solar beams, use is made, in the construction of the apparatus, from materials of high thermal conductivity and high resistance against climatic erosion and corrosion caused by waters, The cylinder-deposit may be provided with a protecting cover which prevents the, cooling of the contained water caused by the environmental air.

Having sufficiently described the nature of the present invention as well as one way of putting it into practice, it only remains to be added that changes in the form, materials and dispositions may be introduced in the invention as a whole, or in parts which it is composed of, as long as such alterations do not vary substantially the characteristics of the invention which is claimed as follows.

What is claimed is:

1. A shower apparatus for exterior use, comprising:
    an inlet connectable to a water supply;
    a generally cylindrical, water tank, formed of aluminum-magnesium alloy, installed in a substantially vertical orientation and receiving water from the inlet to store and heat water, the aluminum-magnesium alloy water tank being formed so as to heat water contained therein by at least one of solar radiation and environmental heat;

support means to support the shower apparatus;

water flow means comprising a shower head connected to the water tank to supply water as a shower spray; and an emptying plug positioned at a bottom position on the tank for removing water therefrom.

2. The shower apparatus of claim 1, wherein the water tank is further constructed of a rigid material and the support means comprises the water tank.

3. The shower apparatus of claim 1, wherein the thermally conducting material is further formed so as to resist erosion and corrosion.

4. The shower apparatus of claim 1, further comprising a removable cover for the water tank so as to reduce loss of heat from the water tank to surrounding air.

5. The shower apparatus of claim 1, further comprising:

a hot water channel from the water supply through the water tank;

a cold water channel bypassing the water tank from the water supply; and mixing means for mixing water from the hot and cold water channels so as to adjust temperature of the shower spray.

* * * * *

UNITED STATES PATENT AND TRADEMARK OFFICE
CERTIFICATE OF CORRECTION

PATENT NO. : 5,660,164

DATED : AUGUST 26, 1997

INVENTOR(S) : RODRIGUEZ SANCHEZ

It is certified that error appears in the above-identified patent and that said Letters Patent is hereby corrected as shown below:

Title page, [76] Inventor: "Torrehjerro" should read --Torrehierro--

Title page, [57] Abstract, line 1: delete "apparatus" after the word "solar"

Col. 1, line 49: "manicuring" should read --manufacturing--

Col. 2, line 35: insert --(9)-- after the word "protector"

Signed and Sealed this

Seventh Day of July, 1998

*Attest:*

BRUCE LEHMAN

*Attesting Officer*     *Commissioner of Patents and Trademarks*